US007765060B1

(12) United States Patent
Kennedy

(10) Patent No.: US 7,765,060 B1
(45) Date of Patent: Jul. 27, 2010

(54) SYSTEM AND METHOD FOR IDENTIFYING CHANGES ON NAVIGATION PROCEDURE CHARTS

(75) Inventor: Brian B Kennedy, Portland, OR (US)

(73) Assignee: The Boeing Company, Chicago, IL (US)

(*) Notice: Subject to any disclaimer, the term of this patent is extended or adjusted under 35 U.S.C. 154(b) by 888 days.

(21) Appl. No.: 11/613,776

(22) Filed: Dec. 20, 2006

(51) Int. Cl.
*G01C 21/00* (2006.01)
(52) U.S. Cl. .................................... 701/200
(58) Field of Classification Search .............. 701/3–7, 701/200, 211
See application file for complete search history.

(56) References Cited

U.S. PATENT DOCUMENTS

| 6,542,796 | B1* | 4/2003 | Gibbs et al. ............. 701/3 |
| 2002/0082773 | A1* | 6/2002 | Ikeuchi et al. .......... 701/211 |
| 2002/0097258 | A1 | 7/2002 | Maymudes et al. |
| 2004/0046712 | A1 | 3/2004 | Naimer et al. |
| 2005/0288831 | A1 | 12/2005 | Lusardi et al. |
| 2007/0168120 | A1 | 7/2007 | Vandenbergh et al. |

FOREIGN PATENT DOCUMENTS

| EP | 1020778 A | 7/2000 |
| WO | 9815912 A | 4/1998 |
| WO | 0173734 A | 10/2001 |
| WO | 0240943 A | 5/2002 |

OTHER PUBLICATIONS

International Search Report and Written Opinion dated Apr. 29, 2008 for PCT/US2007/086047, 16 pgs.
Dubet, Stephane; Aeronautical Charts for Electronic Flight Bags; Digital Avionics Systems Conference; vol. 2, Issue 12—Oct. 16, 2003; pp. 13.d.1-13.1-9 vol. 2.

* cited by examiner

*Primary Examiner*—Kim T Nguyen
(74) *Attorney, Agent, or Firm*—Klintworth & Rozenblat IP LLC

(57) ABSTRACT

A system and method are provided for identifying changes on navigation procedure charts. A processing system is coupled with a user interface and a display device for access and display of old and new navigation procedure charts from different revision cycles. A computer software-based differences engine of the processing system obtains an old navigation procedure chart from an old chart storage memory and a new navigation procedure chart from a new chart storage memory. The differences engine determines changes in information from the old navigation procedure chart to the new navigation procedure chart. The navigation procedure charts may, for example, be aeronautical charts. The changes in information are visually identified such that the user can easily determine the changes that have been made from an old chart to a corresponding new chart.

30 Claims, 7 Drawing Sheets

FIG. 4

SYSTEM AND METHOD FOR IDENTIFYING CHANGES ON NAVIGATION PROCEDURE CHARTS

FIELD OF THE INVENTION

The present invention relates generally to navigation procedure charts such as aeronautical charts and marine navigation charts, and more particularly to systems that display navigation procedure charts that are periodically updated.

BACKGROUND OF THE INVENTION

Navigation procedure charts are used to assist in navigation of carrier vehicles such as airplanes, marine vessels (e.g. ships, boats, etc.), rail vehicles or trucking vehicles. For example, aeronautical charts, in particular, are used by pilots to gain an understanding of the geographic layout of an airport including the airport terminals as well as the surrounding vicinity of an airport which may include arrival and departure areas. Arrival and departure areas may, for example, cover an area within 100 miles of an airport. Aeronautical charts provide information that is particularly useful to pilots for take-off and landing of an airplane at an airport as well as approaches to and departures from an airport. Sets of aeronautical charts may be delivered to pilots or other personnel in various ways such as in paper form or in electronic form on a computer-readable storage device (such as a CD-ROM). Typically, the number of charts actually delivered may be very high, for instance, a new set of aeronautical charts may include hundreds or even many thousands of charts.

In order to accurately reflect geographic and procedural changes made relating to a terminal, its approaches and procedures, aeronautical charts are periodically updated with such changes. Thus, a customer of aeronautical charts (such as a pilot or other aircraft personnel) periodically will receive an entire new set of charts. A new set may, for example, be sent out on a computer-readable device, such as a CD-ROM, to customers every two to four weeks. The memory devices delivered to customers, for instance, may store thousands of aeronautical charts with some charts being changed and other charts left unchanged. Often, during a revision cycle a relatively small percentage of charts are changed; however, this may still amount to hundreds of aeronautical charts being changed out of the many thousands of charts delivered. The customer may selectively view and print out the stored charts from a computer device or view displayed charts on an airplane by placing the CD-ROM (or other memory device) in a portable computer device (such as a laptop computer) that is carried on the airplane itself.

Navigation procedure charts, such as aeronautical charts, have a significant amount of detail and are often technically complex. Thus, in many instances it may be difficult to determine which charts have changed between revision cycles. Furthermore, even if a navigation procedure chart is known to have been changed it is beneficial to be able to easily identify the chart elements that have been changed among the detailed information in the chart. Accordingly, there is a need to provide navigation procedure charts that easily identify changes that have been made from a past revision cycle.

SUMMARY

A system and method are provided for identifying changes on navigation procedure charts. A processing system is coupled with a user interface and display device for access and display of various navigation procedure charts. A computer software-based differences engine of the processing system obtains an old navigation procedure chart from an old chart storage memory and a new navigation procedure chart from a new chart storage memory. The differences engine determines changes in information from the old navigation procedure chart to the new navigation procedure chart. The changes in information are visually identified such that the user can easily determine the changes that have been made from the old navigation procedure chart to the new navigation procedure chart.

In an exemplary embodiment, the old and new navigation procedure charts comprise an old aeronautical chart and a corresponding new aeronautical chart from different revision cycles. Changes in aeronautical information from the old aeronautical chart to the new aeronautical chart are determined by the processing system and are identified such that added changes are displayed in one format and removed changes are displayed in another format. In addition to aeronautical applications, navigation procedure charts may be used in various other applications such as marine navigation, rail hub management or trucking hub management. Various types of navigation procedure charts (such as aeronautical charts, marine navigation charts, rail hub management charts, trucking hub management charts) may be analyzed in order to identify changes between corresponding old and new charts.

BRIEF DESCRIPTION OF THE DRAWINGS

FIG. 4 illustrates an example of an original charts display that displays an old aeronautical chart adjacent to corresponding new aeronautical chart.

DETAILED DESCRIPTION

Figure 1:
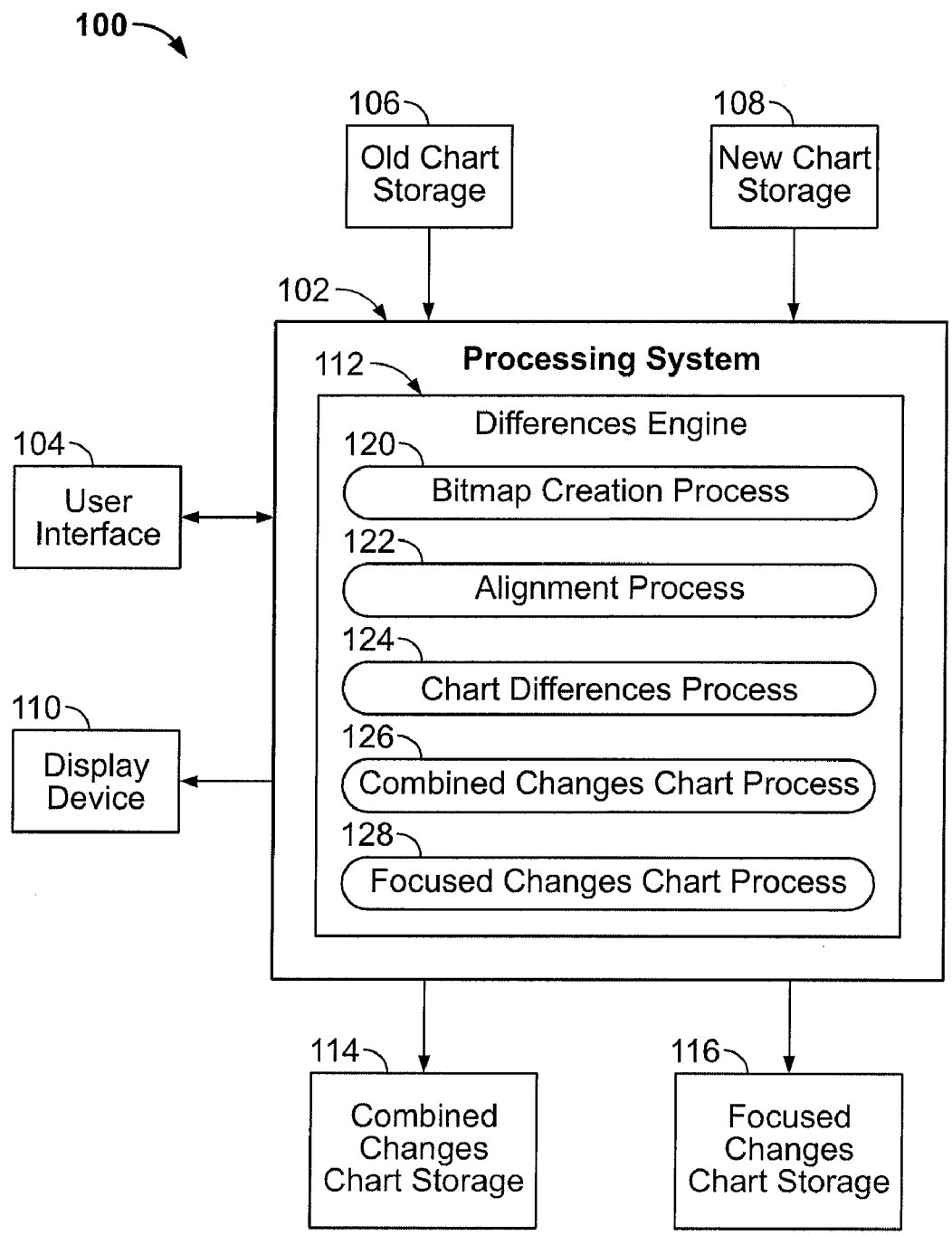
FIG. 1 is a system diagram illustrating an example system for identifying changes on navigation procedure charts.

A system and method for identifying changes on navigation procedure charts are provided. A computer-based processing system interacts with a user interface and a display device to provide user access and display of navigation procedure charts stored in memory. Navigation procedure charts may be used in various applications such as aeronautical navigation, marine navigation, rail hub management or trucking hub management. Thus, various types of navigation procedure charts including aeronautical charts, marine navigation charts, rail hub management charts, and trucking hub management charts may be analyzed by the processing system in order to determine and identify changes between corresponding old and new charts. Navigation procedure charts generally graphically and textually depict one or more of procedures, navigation aids, communication frequencies, navigation points or aids, or notes that may be used by a crew member to navigate a vehicle or craft. A navigation procedure chart may also graphically depict physical geography to assist in navigation. Sets of navigation procedure charts associated with various revision cycles are accessible by the processing system. At each periodic revision cycle, a new set of navigation procedure charts are provided and may be accessed by the processing system. Various navigation procedure charts in the set may have changes in chart elements such as geographic or textual navigational information relative to corresponding charts from previous revision cycles.

In an exemplary embodiment, aeronautical charts are analyzed to determine changes between an old aeronautical chart from one revision cycle and a new aeronautical chart from a more recent revision cycle. Changes in aeronautical information from the old aeronautical chart to the new aeronautical chart are determined by the processing system and are identified such that added changes are displayed in one format and removed changes are displayed in another format. The aeronautical charts, which may include, for example, airport terminal charts with related surrounding geographic information, are accessed by the processing system for display on a display device. An aeronautical chart may graphically and textually depict aeronautical, geographical, and physical elements as well as procedures used by pilots to navigate to or from an airport. The processing system may be implemented, for example, on any type of computer system capable of processing computer programs such as a personal computer, laptop computer, server, on any other computer-based device.

The processing system, in response to user selection, accesses a selected aeronautical chart from a set of charts relating to one revision cycle and accesses as a corresponding aeronautical chart from another set relating to another revision cycle and compares the two charts for changes. The charts obtained will generally correspond to one another, for example, they may relate to the same airport terminal or geographic location. Since the aeronautical charts that are compared to one another by the processing system are associated with different revision cycles, at least one chart will be an old aeronautical chart (from a prior revision cycle) relative to the new aeronautical chart from a more recent or updated revision cycle. The changes in information between the selected old aeronautical chart and the new aeronautical chart are visually displayed and graphically highlighted in order for the user to easily determine added or removed changes between corresponding aeronautical charts obtained from chart sets relating to different revision cycles.

Referring to FIG. 1, system 100 for identifying changes on navigation procedure charts is shown. For purposes of illustration, the navigation procedure charts described with reference to FIGS. 1-7 are aeronautical charts; however, other types of navigation charts such as marine navigation or nautical charts may be employed. System 100, in this example, has processing system 102 coupled with user interface 104 to provide for user selection and access to old aeronautic charts digitally stored in electronic format in old chart storage memory 106. Processing system 102 is also coupled with new chart storage memory 108 which stores new aeronautical charts associated with a revision cycle that comes after the earlier revision cycles. Processing system 102 obtains an old aeronautical chart from old chart storage memory 106 and a new aeronautical chart from a new chart storage memory 108 for display and user viewing on display device 110, such as a computer screen, cathode ray tube (CRT), or any other display apparatus associated with the processing system. User interface 104 may, for example, be a keyboard, mouse, graphical user interface (GUI) or any other interface that allows a user to interact with the processing system.

Figure 4:
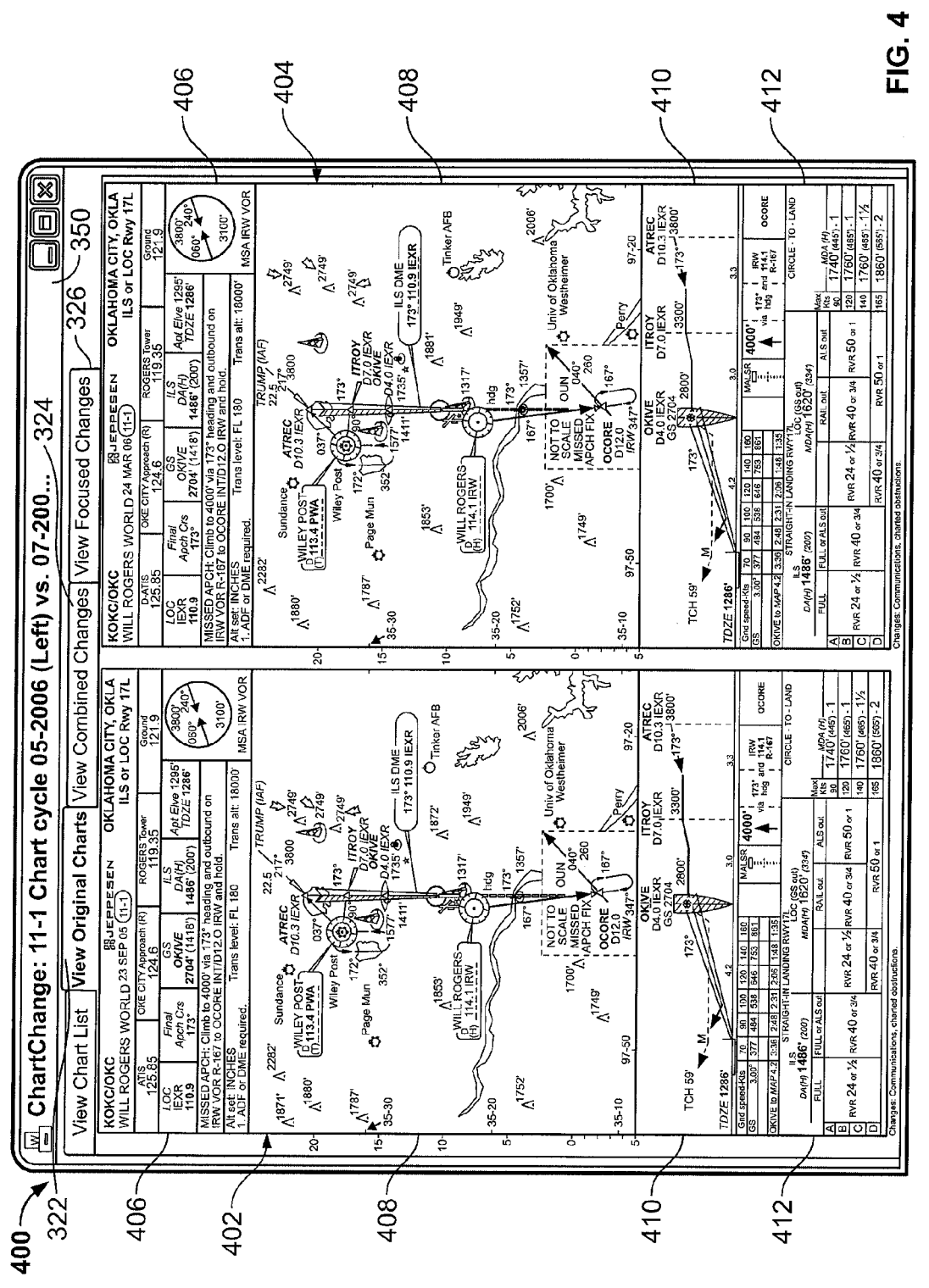

Chart display 400, seen in FIG. 4, shows a example of an old aeronautical chart 402 adjacently positioned for display next to a corresponding new aeronautical chart 404. In this example, charts 402, 404 have a number of different generally rectangular-shaped sections providing aeronautical information. Charts 402 and 404, include: header section 406 providing text information; a geographic plan view section 408 of the associated region, a profile view section 410 that provides altitude information, and a minimums section 412 providing further aeronautical data generally in text form.

Referring again to FIG. 1, differences engine 112 of processing system 102, in this example, is a computer software-based engine that determines changes in information from an old aeronautical chart to a corresponding new aeronautical chart. The differences engine component 112 further creates a combined changes chart 510, FIG. 5, that may be displayed or saved for storage at combined changes chart storage 114 in memory. A combined changes chart identifies changes on a chart from a previous chart in which added changes are reflected in one format (such as displayed in one color) and removed changes are reflected in another format (such as displayed in another color). Differences engine component 112 also may selectively create a focused changes chart 710, FIG. 7, for display or storage at focused changes chart storage 116, FIG. 1, in memory. A focused changes chart identifies the changes between an old chart and a new chart by displaying the added changes and removed changes as in a combined changes chart and also de-emphasizing the similarities between the two charts. In creating these charts 510, 710 the differences engine component 112 of processing system 102 graphically highlights the changes in information between the selected old aeronautical chart 402, FIG. 4, and the new aeronautical chart 404.

Figure 5:
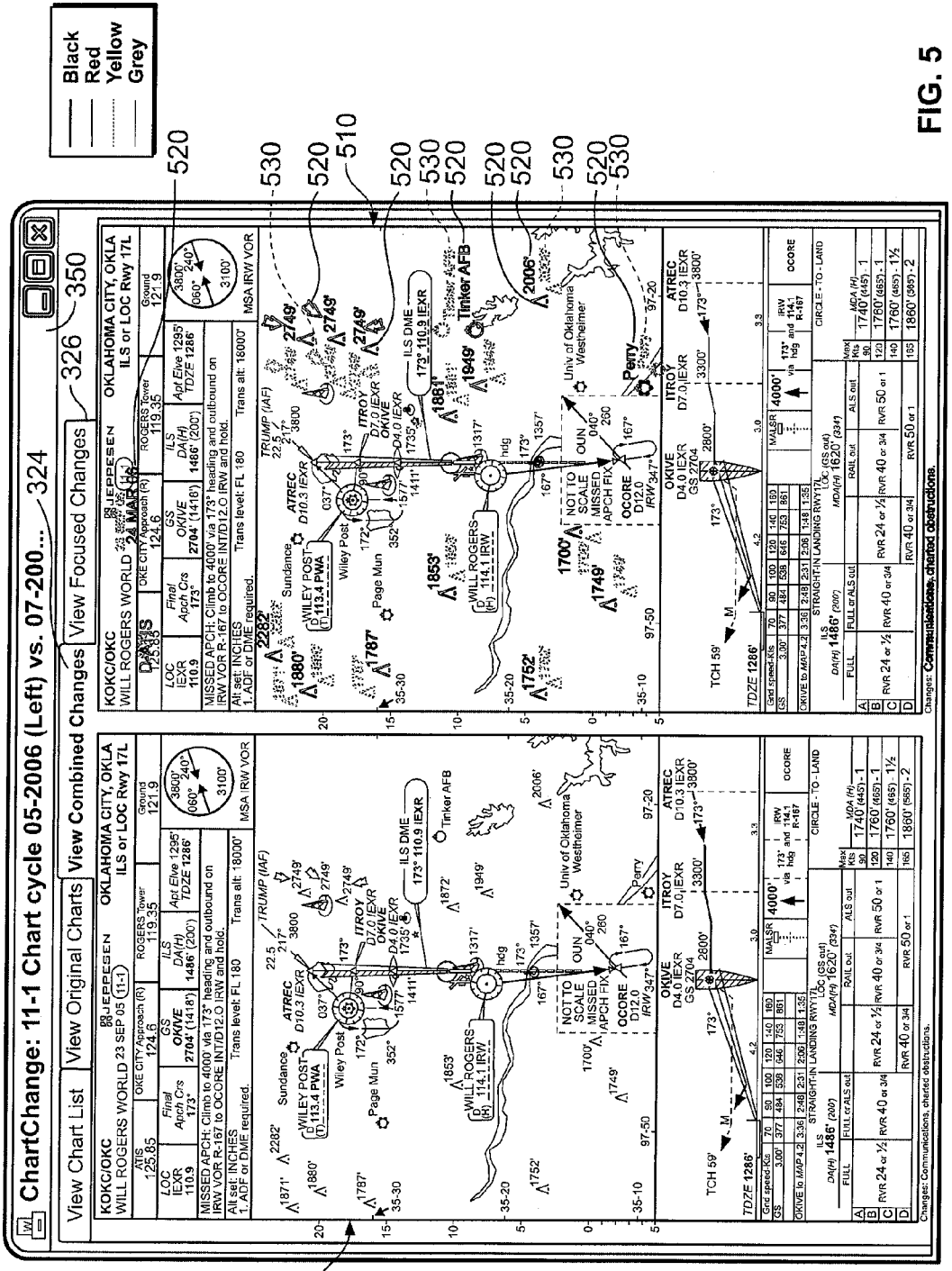
FIG. 5 illustrates an example of an old aeronautical chart displayed adjacent to a combined changes chart highlighting added and removed information relating to the corresponding new aeronautical chart.

In order for the user to be able to quickly and easily review changes made between corresponding old and new charts from different revision cycle sets, differences engine 112 creates combined changes chart 510, FIG. 5, in which added changes are graphically highlighted for display in one format and removed changes are graphically highlighted for display in another format. For instance, added changes from the old chart 402, FIG. 4, to the new chart 404 are displayed in one easily identifiable color (such as red) and removed changes from the old chart to the new chart are displayed in another easily identifiable color (such as yellow). The different formats corresponding to different types of changes may be displayed as different colors, different patterns, different display fonts or any other differentiating format to illustrate added changes versus removed changes between the charts.

Figure 7:
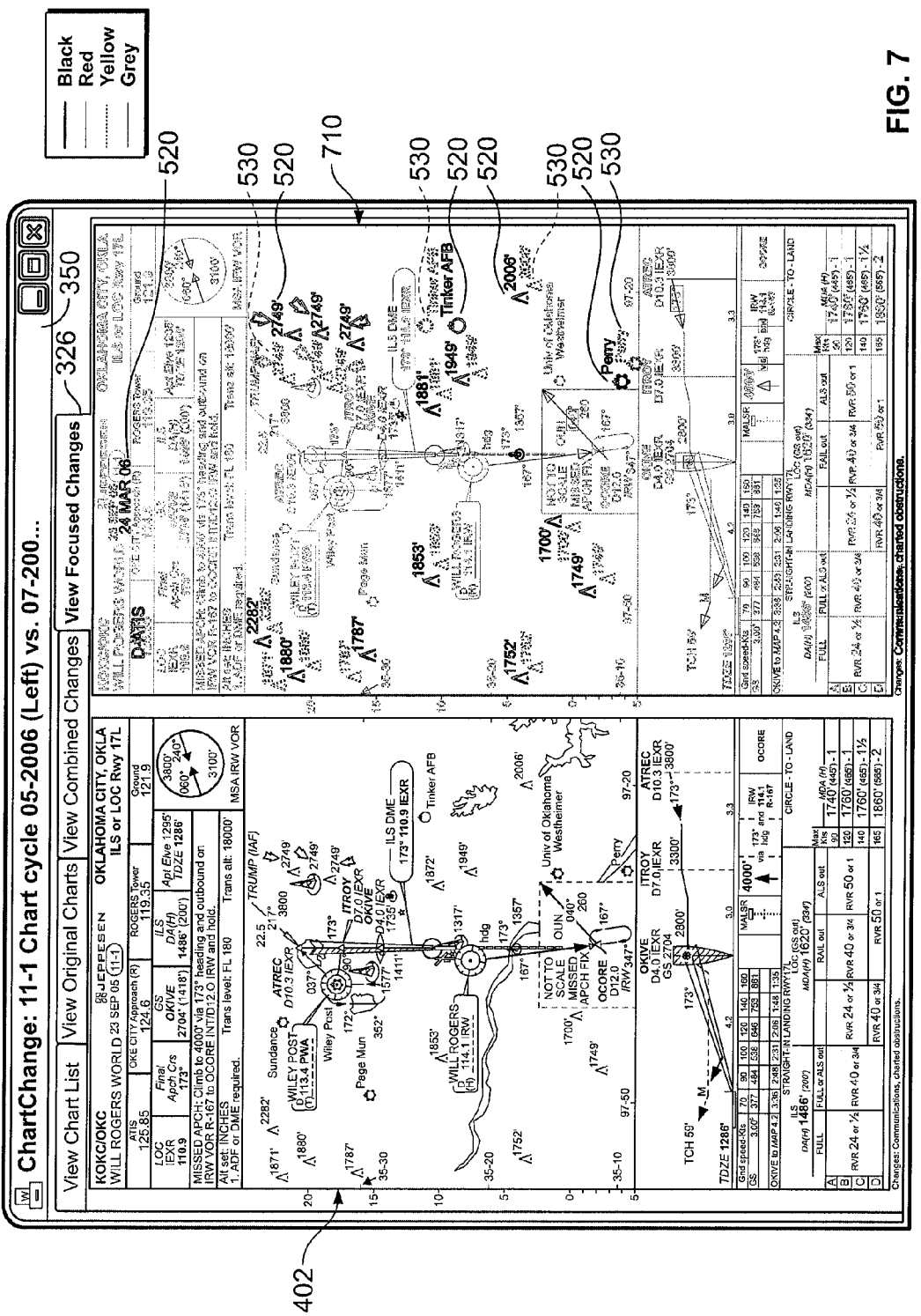
FIG. 7 illustrates an example of an old aeronautical chart displayed adjacent to a focused changes chart that emphasizes chart information changes and de-emphasizes non-changes between corresponding old and new aeronautical charts.

As seen, differences engine component 112, FIG. 1, in this example, includes bitmap creation process 120, alignment process 122, chart differences process 124, combined chart changes process 126, and focused changes chart process 128. Bitmap creation process 120 is employed to convert old and new aeronautical charts from their stored electronic format into bitmaps. Alignment process 122 is used for alignment of the old aeronautical chart with the new aeronautical chart selected and determining the number of matching pixels counted between the charts when the charts are aligned. Chart differences process 124 examines pixel colors of the old chart and corresponding pixel colors of the new chart, aligned therewith, to determine information added to the new chart relative to the old chart and to determine information removed from the old chart relative to the new chart. The changes in aeronautical information identified and highlighted for visual display may include geographic aeronautical information and textual aeronautical information. Combined changes chart process 126 is employed for creating combined changes charts such as chart 510 seen in the example in FIG. 5. Focused changes chart process 128, FIG. 1, is employed for creating focused changes charts 710, such as seen in the example in FIG. 7. As seen in FIG. 7, the added changes 520 and removed changes 530 are visually emphasized in focused changes chart 710 while non-changed information that remains the same between the old and new charts being compared are visually de-emphasized.

Referring again to FIG. 1, to determine changes between old aeronautical charts and corresponding new aeronautical charts, processing system 102 obtains input from old chart storage 106 and new chart storage 108 to identify which aeronautical charts from the stored sets of old and new charts have received changes. For example, each of the sets of aeronautical charts may comprise many thousands of different charts relating to airport terminals or geographic areas. At each revision cycle, for instance, a few hundred (e.g. 100-500) aeronautical charts out of the thousands in a set may have changes made to them. The processing system 102 determines which aeronautical charts in new chart storage have received changes and creates a list of aeronautical charts that have changes from the charts among a set of old aeronautical charts and a set of new aeronautical charts.

Figure 3:
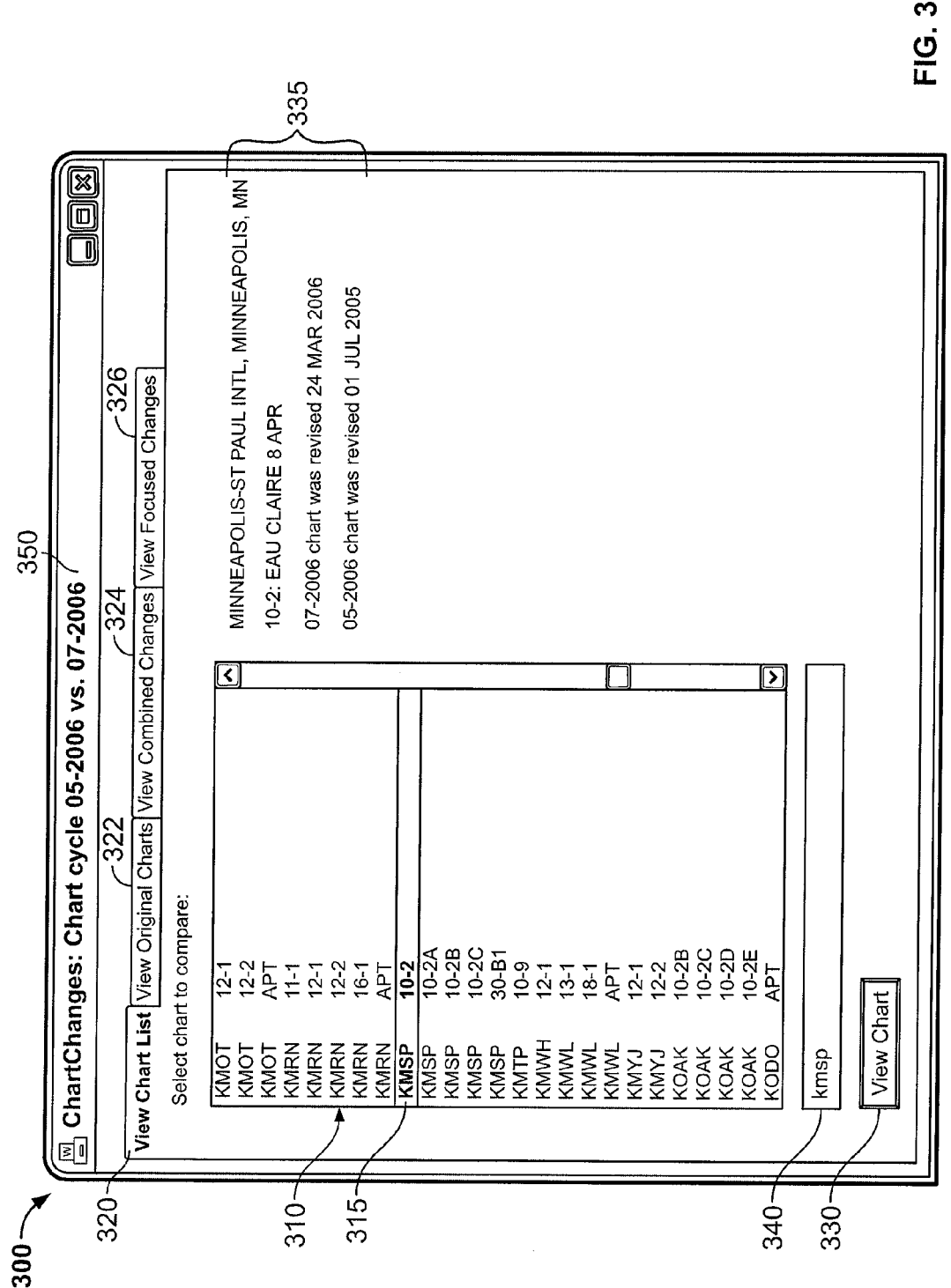
FIG. 3 illustrates an example display of a list of aeronautical charts for user selection and viewing.

As seen in FIG. 3, processing system 102 creates for display on display device 110 a list 310 of aeronautical charts that have been changed. The user can select and compare charts that have been changed from one revision cycle to another cycle. For example, as seen in FIG. 3, the user may select view charts list tab 320 to select a chart that has changed between particular aeronautical chart revision cycles (e.g. cycle 05 of year 2006 versus cycle 07 of year 2006). The user may apply user interface 104, FIG. 1, to select a particular chart 315, FIG. 3, from the displayed list 310 to compare the corresponding old and new charts. Upon selection of a particular chart 315 from the chart difference list 310 the user may actuate a view chart button 330 for display of the selected charts. In response, the processing system 102 will extract the selected old aeronautical chart from old chart storage 106 and the corresponding new aeronautical chart from new chart storage 108. The old and new charts may be stored in an electronic file format, such as a vector format. The processing system 102 obtains the electronic files for the corresponding old and new aeronautical charts in a compressed form and proceeds to decompress the old and new chart files obtained from old and new chart storage memory 106, 108.

Figure 2:
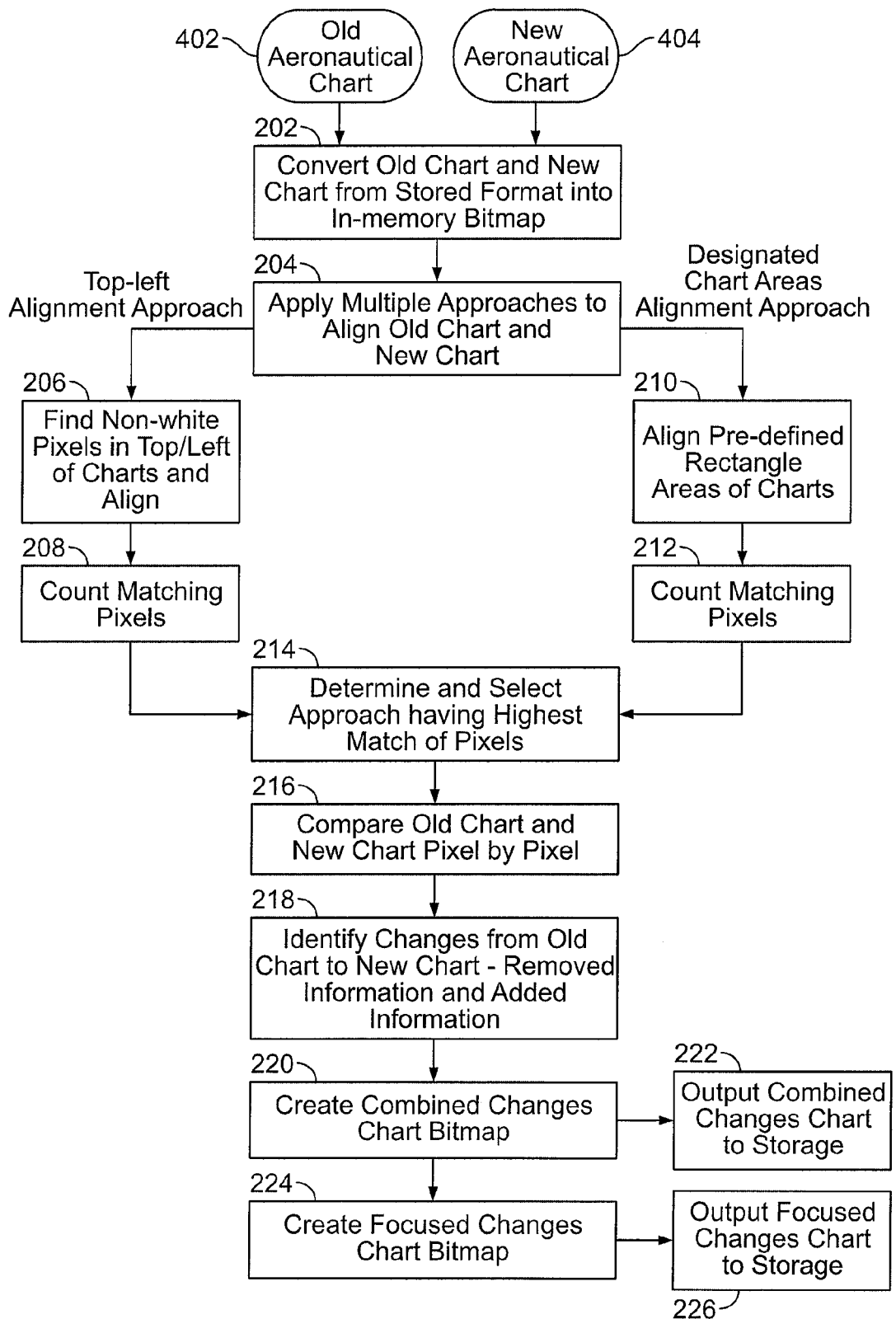
FIG. 2 is a flow chart illustrating an example of processing steps at a differences engine component of the system of FIG. 1.

Referring now to FIG. 2, the processing performed at differences engine component 112 of processing system 102 to determine and identify, for display, changes between corresponding old and new aeronautical charts is provided. The differences engine component 112 obtains the selected old aeronautical chart 402 and corresponding new aeronautical chart 404 as decompressed electronic files. In step 202, bitmap creation process 120 of differences engine 112 converts the old chart 402 and new chart 404 from the stored electronic format into in-memory bitmaps.

In step 204, alignment process 122 then applies multiple approaches to determine and select a preferred alignment approach for alignment of the old aeronautical chart 402 and the new aeronautical chart 404. In order to accurately compare the two bitmap representations of charts, the common parts of the old and new charts 402, 404 are matched closely. The old and new charts being compared, for instance, are not necessarily the same size. Further, the amount of white space on the sides may have changed and various portions of the charts may have been moved for better viewing. Alignment process 122, in this example, applies two different alignment approaches and selects a preferred approach having the most common ground between the old and new charts. One approach that may be used is a top-left alignment approach. In step 206, alignment process 122 finds non-white pixels at the top and left sides of the old and new charts aligns them together. Alignment process 122 starts comparing the charts 402, 404 at the first point (starting at the top left region) where there are non-white pixels on the chart. Border size differences are ignored using this approach. In step 208, alignment process counts the matching pixels once the charts are aligned. A second approach is a designated chart areas alignment approach. In step 210, alignment process 122 aligns pre-defined rectangle areas of the old and new charts 402, 404, FIG. 4, that identify the header section 406, plan view section 408, profile view section 410, and minimums section 412 of the charts. In step 212, alignment process 122 counts the matching pixels using this approach.

In step 214, FIG. 2, alignment process 122 determines which alignment approach has the highest number of matching pixels and selects the alignment approach with the highest number for use in determining chart differences by chart differences process 124. In step 216, chart differences process 124, FIG. 1, of differences engine 112 compares the selected old chart 402, FIG. 4, and new chart 404 pixel by pixel. In step 218, FIG. 2, chart differences process 124 identifies changes from the old chart to the new chart. In particular, chart differences process 124 distinguishes between changes where information has been removed from the new chart versus changes where information has been added to the new chart.

In order to determine if information was added to or removed from an old chart to a new chart, chart differences process 124 applies a software-based heuristic test. Chart differences process 124 examines the colors of the corresponding old and new pixels. The software based heuristic test compares the pixel colors in the old chart to the corresponding pixel colors in the new chart to determine which changes are added information versus which changes are removed information. The software-based heuristic test is applied in which black or grey pixels in the old chart 402, FIG. 4, that change to non-black or non-grey pixels in the new chart 404 are considered removed information and changes that do not match the heuristic test are considered added information to the new chart. As noted, added information is identified for display in one format and removed information is in a different format in order for the user to easily distinguish between chart elements that have been added, removed, or remain unchanged. In particular, chart differences process 124 may apply, and display identified changes in different colors to represent the two types of changes such as red for newly added information and yellow for removed information.

In step 220, FIG. 2, combined changes chart process 126 creates a combined changes chart in-memory bitmap. A combined changes chart 510, FIG. 5, may be displayed on display device 110, FIG. 1, for user viewing or saved and stored in memory for later retrieval. As seen in FIG. 5, in combined changed chart 510, added changes 520 are identified and graphically highlighted for display in one format (such as in red color) and removed changes 530 are identified and graphically highlighted for display in another format (such as in yellow color). In step 222, FIG. 2, combined changes chart process 126 may create a bitmap file of combined changes chart and output the created combined changes chart bitmap for storage in memory in combined changes chart storage 114.

In step 224, FIG. 2, focused changes chart process 128 creates a focused changes chart in-memory bitmap. Focused changes chart 710, FIG. 7, may be displayed on display device 110, FIG. 1, for user viewing or saved and stored in memory in focused changes chart storage 116 for later retrieval. As seen in FIG. 7, added and removed changes to chart information from the old chart to the new chart are emphasized on the focused chart changes. For example, added changes are graphically highlighted in one color (e.g. red) and removed changes in another color (e.g. yellow). Focused changes chart process 128 also visually de-emphasizes chart elements that remain unchanged from the old chart to the new chart. In creating focused changes chart 710, FIG. 7, process 128, FIG. 1, turns unchanged black or grey pixels from the combined changes chart 510, FIG. 5, into a light grey color, and turns any colored pixels that do not represent added or removed changes into a white color. Pixels that match in the old chart and new chart are turned into a de-emphasized light grey color and colored pixels representing terrain or water are removed by coloring them white. In step 226, focused changes chart process 128 may output the focused changes chart 710 as a bitmap for storage in memory in focused changes chart storage 116.

Referring to FIG. 3, aeronautical charts list display 300 is shown and may be displayed upon user activation of a view chart list tab 320. A list 310 of aeronautical charts is provided for user selection indicating charts that have changes. For example, chart list 310 may display a listing of aeronautical charts that have changed between two revision cycles; such as charts relating to certain coverage areas for a particular customer. When a user selects a chart from the list 310, airport and associated information 335 for the chart is shown to the right of the list. The information 335 displayed assists the user in selecting a chart desired for viewing. A user may, for example, be able to search for a specific airport by entering an airport ID in a text edit box 340 below the chart list 310. The chart list 310 will scroll to the first chart for that airport. When the user has found a chart that is selected for comparing differences, a view chart button 330 may be actuated or double click actuation on the list entry 315 for the chart may be performed. This will prompt processing system 102, FIG. 1, to access aeronautical charts from both revision cycles, and display them side-by-side upon actuation of view original charts tab 322.

As seen in FIGS. 4, 5 and 7, aeronautical chart displays for viewing changes to aeronautical charts are associated with three chart viewing tabs: view original charts tab 322, view combined changes tab 324, and view focused changes tab 326. These tabs 322, 324, 326 provide side-by-side (or top-bottom) viewing of old aeronautical charts 402 and corresponding new aeronautical charts 404, 510, 710 from different cycles. The displays as seen in the examples in FIGS. 4, 5 and 7, show both the older cycle chart and the newer cycle chart together side-by-side. The new chart (relative to the old chart) may be displayed on the right-hand side of the display (or alternatively on the bottom when charts are shown in landscape mode). A title bar 350 may be provided for display of the airport and chart identifier, and indicates which charts associated with particular revision cycles are shown in which window.

Referring to FIG. 4, user actuation of view original charts tab 322 shows old aeronautical chart 402 and corresponding new aeronautical chart 404 from selected revision cycles displayed in their original form. The view original charts tab 322 may be used as a baseline to view selected charts in their original form. Due to the significant amount of information that may be displayed on aeronautical charts, the changes from an old chart to a corresponding new chart may be subtle. The user may selectively use view combined changes tab 324 and view focused changes tab 326 to easily see what has changed to the charts between revision cycles. Referring to FIG. 5, user actuation of view combined changes tab 324 displays the selected old aeronautic chart 402 adjacent to a corresponding new aeronautic chart, but in the form of a combined changes chart 510 that identifies or marks the areas (such as textual and geographic information) that have changed from the old revision cycle to the new revision cycle. In particular, on the combined changes chart 510, FIG. 5, added changes are visually displayed in one format 520 and removed changes are visually displayed in another format 530 in order for the user to be able to easily identify the types of changes that have been made. The different formats may be different colors (such as red and yellow), different patterns, different display fonts or any other differentiating format to graphically illustrate the added changes versus the removed changes made to the charts. Information that has not been changed remains the same and is displayed in the same form as seen in the old aeronautical chart 402.

Figure 6:
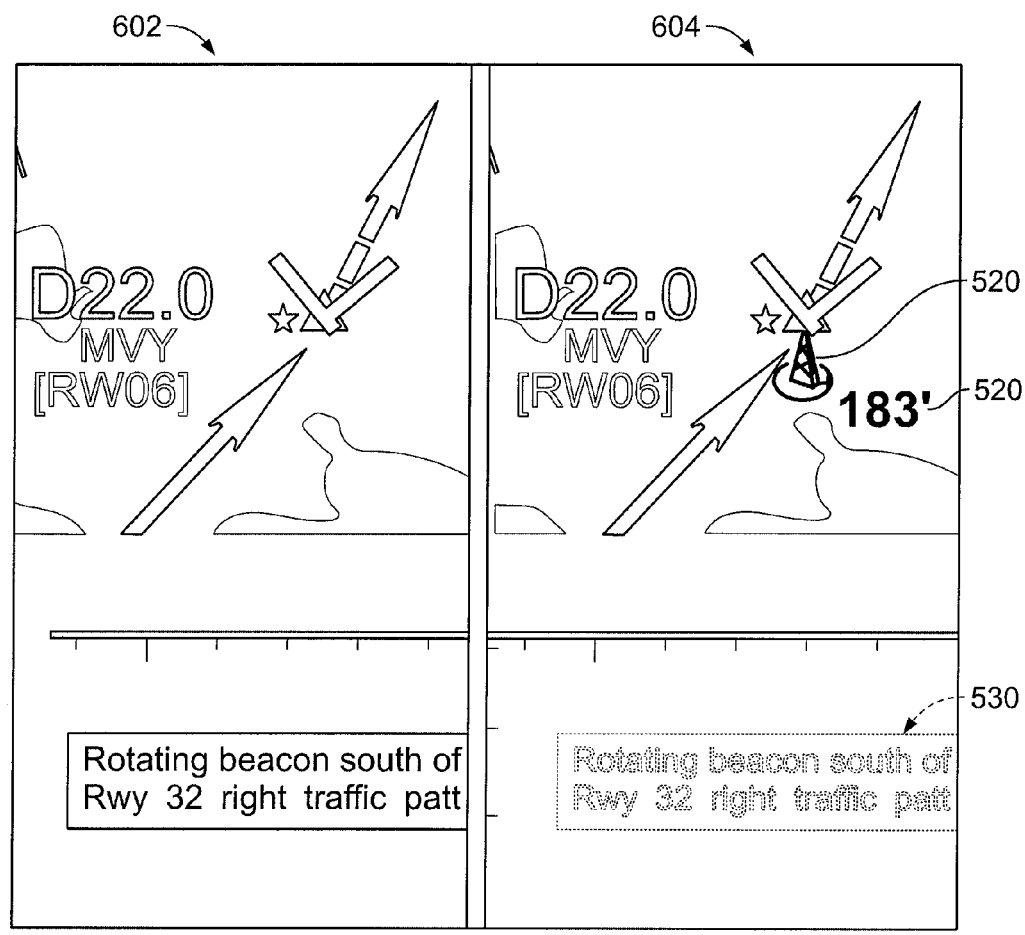
FIG. 6 illustrates an example identifying added and removed information on a portion of an aeronautical chart.

Referring to FIG. 6, an example illustrating the visual identification of added and removed changes between an old aeronautical chart and a corresponding new chart (as a of portion combined changes chart) is provided. The display 602 on the left-hand illustrates example portions of an old aeronautical chart. The display 604 on the right hand illustrates corresponding example portions with different display formats to highlight added changes 520 and removed changes 530. In this example, one color (such as red) is used to illustrate information on the chart that has been added since the older revision chart. The 183 foot tower in this example seen in the right-hand portion 604 is added to a new aeronautical chart and is graphically highlighted in red color, for instance, to easily identify added changes 520. Additionally, another color (such as yellow) is used to illustrate information 530 on the chart that has been removed from the old aeronautical chart. As seen in the example in FIG. 6, the text relating to a "rotating beacon" may be graphically highlighted in a different format such as a yellow color, for instance, to easily identify text 530 that has been removed from the old chart and is not included in the new revision of the chart.

Referring to FIG. 7, user actuation of view focused changes tab 326 displays the selected old aeronautical chart 402 adjacent to a corresponding new aeronautic chart, but in the form of a focused changes chart 710. As with the combined changes chart 510 in FIG. 5, the focused changes chart 710, FIG. 7, illustrates and marks the chart information that has changed from the old cycle to the new cycle. Added changes are graphically highlighted in one display format (such as in a red color) and removed changes in another display format (such as in a yellow color). As seen in the example of FIG. 7, however, the information on the focused changes chart 710 that has no changes is displayed in a light grey color in order to make the changes in chart information to stand out. The focused changes chart 710 display for identifying chart changes may be useful when aeronautical charts contain terrain, or when changes indicated in color (e.g. red, yellow) may blend into the original charts. In this example, terrain and water features may be eliminated to give a more simplified and focused view of the changes. The focused changes chart 710 provides a representation that downplays the similarities between charts of different revision cycles and makes the differences stand out. The focused effect may be accompanied, for example, by turning black or grey pixels into a light grey color, leaving red, yellow and white pixels alone, and turning any other colored pixels into a white color.

The foregoing description of the preferred embodiments of the invention have been presented for purposes of illustration and description, and are not intended to be exhaustive or to limit the invention the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below. For example, various navigation procedure charts such as marine navigation charts, rail hub management charts or trucking hub management charts may be employed as alternatives to aeronautical charts as described in the exemplary embodiment herein.

What is claimed is:

1. A method for identifying changes on a navigation procedure chart comprising:
    selecting an older revision cycle of a navigation procedure chart from a storage memory having a plurality of revision cycles of the navigation procedure chart;
    selecting another newer revision cycle, of the navigation procedure chart, which is newer than the selected older revision cycle of the navigation procedure chart, relative to the old chart;
    determining changes in information, including additions and deletions, which were made to the older revision cycle of the navigation procedure chart to arrive at the newer revision cycle of the navigation procedure chart;
    displaying the newer revision cycle of the navigation procedure chart; and
    graphically distinguishing, on the displayed newer revision cycle of the navigation procedure chart, between the additions and the deletions which were made to the older revision cycle of the navigation procedure chart to arrive at the newer revision cycle of the navigation procedure chart.

2. The method of claim 1 wherein the graphically distinguishing comprises displaying the additions in one color on the displayed newer revision cycle of the navigation procedure chart and displaying the deletions in another color on the displayed newer revision cycle of the navigation procedure chart.

3. The method of claim 1 wherein the changes in information comprise geographic information and textual information.

4. The method of claim 1 further comprising examining pixel colors of the older revision cycle of the navigation procedure chart and corresponding pixel colors of the newer revision cycle of the navigation procedure chart; and
    applying a software heuristic test that compares the pixel colors in the older revision cycle of the navigation procedure chart to the corresponding pixel colors in the newer revision cycle of the navigation procedure chart to determine which changes are the additions versus which changes are the deletions.

5. The method of claim 1 wherein the graphically distinguishing comprises graphically highlighting the additions in one format and the deletions in another format.

6. The method of claim 5 further comprising graphically de-emphasizing, on the displayed newer revision cycle of the navigation procedure chart, the information which was not changed from the older revision cycle of the navigation procedure chart to the newer revision cycle of the navigation procedure chart by graphically highlighting the unchanged information in still another format on the displayed newer revision cycle of the navigation procedure chart.

7. The method of claim 6 wherein the navigation procedure chart is an aeronautical chart, and the graphically de-emphasizing comprises turning pixels that match in the older revision cycle of the aeronautical chart and the newer revision cycle of the aeronautical chart into a light grey color and removing colored pixels representing terrain or water by coloring them white.

8. The method of claim 1 wherein the navigation procedure chart is at least one of: a) an aeronautical chart, b) a marine navigation chart, c) a rail hub management chart, and d) a trucking hub management chart.

9. The method of claim 1 wherein the navigation procedure chart is an aeronautical chart.

10. The method of claim 9 wherein the plurality of revision cycles of the aeronautical chart are stored in electronic formats.

11. The method of claim 10 further comprising converting the older revision cycle of the aeronautical chart and the newer revision cycle of the aeronautical chart from the stored electronic formats into bitmaps.

12. The method of claim 11 further comprising applying a plurality of approaches relating to alignment of the older revision cycle of the aeronautical chart with the newer revision cycle of the aeronautical chart.

13. The method of claim 12 further comprising counting a number of matching pixels for each alignment approach; and
    selecting the alignment approach having the highest number of matching pixels.

14. The method of claim 9 further comprising creating a list of aeronautical charts that have revision cycle changes.

15. The method of claim 4 further comprising selecting one of the aeronautical charts from the list to identify changes in the revision cycles for the one aeronautical chart by following the method.

16. A system for identifying changes on a navigation procedure chart comprising:
    a processing system adapted to obtain an older revision cycle of a navigation procedure chart from an old chart storage memory and to obtain a newer revision cycle of the navigation procedure chart, relative to the older revision cycle of the navigation procedure chart, from a new chart storage memory; and
    a computer software-based engine component adapted to determine changes in information, including additions and deletions, from the older revision cycle of the navigation procedure chart to the newer revision cycle of the navigation procedure chart, to display the newer revision cycle of the navigation procedure chart, and to graphically distinguish, on the displayed newer revision cycle of the navigation procedure chart, between the additions and the deletions made to the older revision cycle of the navigation procedure chart to arrive at the newer revision cycle of the navigation procedure chart.

17. The system of claim 16 wherein the computer software-based engine component is adapted to display the additions in one color and the deletions in another color.

18. The system of claim 16 wherein the changes in information comprise geographic information and textual information.

19. The system of claim 16 wherein the computer software-based engine component is adapted to examine pixel colors of the older revision cycle of the navigation procedure chart and corresponding pixel colors of the newer revision cycle of the navigation procedure chart and to apply a software heuristic test that compares the pixel colors in the older revision cycle of the navigation procedure chart to the corresponding pixel colors in the newer revision cycle of the navigation procedure chart to determine which changes are the additions versus which changes are the deletions.

20. The system of claim 16 wherein the computer software-based engine component is adapted to graphically highlight the additions in one format and to graphically highlight the deletions in another format.

21. The system of claim 20 wherein the computer software-based engine component is adapted to graphically de-emphasize, on the displayed newer revision cycle of the navigation procedure chart, the information which is not changed from the older revision cycle of the navigation procedure chart to the newer revision cycle of the navigation procedure chart by graphically highlighting the unchanged information in still another format on the displayed newer revision cycle of the navigation procedure chart.

22. The system of claim 21 wherein the older revision cycle of the navigation procedure chart is an older revision cycle of an aeronautical chart and the newer revision cycle of the navigation procedure chart is a newer revision cycle of the aeronautical chart, and wherein the computer software-based engine component is adapted to graphically de-emphasize the unchanged information by turning pixels that match in the older revision cycle of the aeronautical chart and the newer revision cycle of the aeronautical chart into a light grey color and removing colored pixels representing terrain or water by coloring them white.

23. The system of claim 16 wherein the navigation procedure chart is at least one of: a) an aeronautical chart, b) a marine navigation chart, c) a rail hub management chart, and d) a trucking hub management chart.

24. The system of claim 16 wherein the navigation procedure chart is an aeronautical chart.

25. The system of claim 24 wherein the older revision cycle of the aeronautical chart and the newer revision cycle of the aeronautical chart are stored in electronic formats.

26. The system of claim 25 wherein the computer software-based engine component is adapted to convert the older revision cycle of the aeronautical chart and the newer revision cycle of the aeronautical chart from the stored electronic formats into bitmaps.

27. The system of claim 26 wherein the computer software-based engine component is adapted to apply a plurality of approaches relating to alignment of the older revision cycle of the aeronautical chart with the newer revision cycle of the aeronautical chart.

28. The system of claim 27 wherein the computer software-based engine component is adapted to count numbers of matching pixels for each alignment approach and to select the alignment approach having the highest number of matching pixels.

29. The system of claim 24 wherein the processing system is adapted to create a list of aeronautical charts that have revision cycle changes.

30. The system of claim 29 wherein the processing system is adapted to select one of the aeronautical charts from the list to identify changes in the revision cycles for the one aeronautical chart.

* * * * *